United States Patent
Kim et al.

(10) Patent No.: US 11,996,512 B2
(45) Date of Patent: *May 28, 2024

(54) ELECTRODE ASSEMBLY HAVING IMPROVED SAFETY OF USE BY MEANS OF OUTERMOST ELECTRODE STRUCTURE AND CURRENT COLLECTOR MATERIAL, AND LITHIUM-ION SECONDARY BATTERY HAVING SAME

(71) Applicant: LiBEST INC., Daejeon (KR)

(72) Inventors: Joo Seong Kim, Daejeon (KR); Jin Hong Ha, Daejeon (KR); Gil Ju Lee, Daejeon (KR)

(73) Assignee: LIBEST INC., Daejeon (KR)

( * ) Notice: Subject to any disclaimer, the term of this patent is extended or adjusted under 35 U.S.C. 154(b) by 178 days.

This patent is subject to a terminal disclaimer.

(21) Appl. No.: 16/764,233

(22) PCT Filed: Nov. 14, 2018

(86) PCT No.: PCT/KR2018/013893
§ 371 (c)(1),
(2) Date: May 14, 2020

(87) PCT Pub. No.: WO2019/103392
PCT Pub. Date: May 31, 2019

(65) Prior Publication Data
US 2020/0395592 A1    Dec. 17, 2020

(30) Foreign Application Priority Data

Nov. 24, 2017 (KR) .................... 10-2017-0158097

(51) Int. Cl.
*H01M 10/0525*    (2010.01)
*H01M 4/66*    (2006.01)
(Continued)

(52) U.S. Cl.
CPC ....... *H01M 10/0525* (2013.01); *H01M 4/661* (2013.01); *H01M 10/0459* (2013.01);
(Continued)

(58) Field of Classification Search
CPC .......... H01M 10/413; H01M 10/0459; H01M 10/0418; H01M 10/14; H01M 10/281; H01M 10/282; H01M 10/647
See application file for complete search history.

(56) References Cited

U.S. PATENT DOCUMENTS 11,335,980 B2 * 5/2022 Kim ................. H01M 50/10
2013/0196194 A1 * 8/2013 Park ................. H01M 50/547
429/72

(Continued)

FOREIGN PATENT DOCUMENTS

CN 111386623 A 7/2020
EP 3142171 A1 3/2017
(Continued)

OTHER PUBLICATIONS

The extended European Search Report issued in European application No. 18881568.2, dated Jun. 16, 2021.
(Continued)

*Primary Examiner* — Amanda J Barrow
(74) *Attorney, Agent, or Firm* — HSML P. C.

(57) ABSTRACT

An electrode assembly includes a plurality of unit cells each equipped with a pair of electrodes having different polarities. Electrode tabs protrude from the electrodes. The electrode tabs including at least one electrode parallel connection tab and at least one electrode lead connection tab. In a first unit cell of the plurality of unit cells, a current collector of a first electrode among the pair of electrodes is made of a different material from a current collector of a second electrode among the pair of electrodes having the different polarity.

8 Claims, 10 Drawing Sheets

(51) Int. Cl.
*H01M 10/04* (2006.01)
*H01M 10/0583* (2010.01)
*H01M 50/105* (2021.01)
*H01M 50/178* (2021.01)
*H01M 50/46* (2021.01)
*H01M 50/534* (2021.01)
*H01M 50/54* (2021.01)
*H01M 50/548* (2021.01)
*H01M 50/572* (2021.01)
*H01M 50/574* (2021.01)
*H01M 50/579* (2021.01)

(52) U.S. Cl.
CPC ..... *H01M 10/0583* (2013.01); *H01M 50/105* (2021.01); *H01M 50/178* (2021.01); *H01M 50/46* (2021.01); *H01M 50/534* (2021.01); *H01M 50/54* (2021.01); *H01M 50/548* (2021.01); *H01M 50/572* (2021.01); *H01M 50/574* (2021.01); *H01M 50/579* (2021.01); *H01M 2220/30* (2013.01)

(56) References Cited

U.S. PATENT DOCUMENTS

| | | | | |
|---|---|---|---|---|
| 2015/0017549 | A1* | 1/2015 | Nishimura | H01M 4/485 |
| | | | | 429/231.95 |
| 2016/0149253 | A1 | 5/2016 | Yi et al. | |
| 2017/0005504 | A1* | 1/2017 | Rho | H02J 7/0045 |
| 2017/0077480 | A1* | 3/2017 | Hwang | H01M 10/0436 |
| 2017/0117511 | A1 | 4/2017 | Takahashi et al. | |
| 2017/0309968 | A1* | 10/2017 | Komori | H01M 10/48 |
| 2020/0014016 | A1* | 1/2020 | Kim | H01M 50/10 |
| 2020/0235436 | A1* | 7/2020 | Kim | H01M 10/0525 |
| 2020/0280042 | A1* | 9/2020 | Kim | H01M 50/105 |
| 2020/0280045 | A1* | 9/2020 | Kim | H01M 50/46 |
| 2020/0358043 | A1* | 11/2020 | Kim | H01M 50/124 |
| 2020/0365867 | A1* | 11/2020 | Kim | H01M 50/512 |
| 2021/0043883 | A1* | 2/2021 | Kim | H01M 10/049 |

FOREIGN PATENT DOCUMENTS

| | | | | |
|---|---|---|---|---|
| JP | 2000231914 A | | 8/2000 | |
| JP | 2000235850 A | | 8/2000 | |
| JP | 2002-141055 | * | 5/2002 | .............. H01M 2/30 |
| JP | 2002141055 A | | 5/2002 | |
| JP | 4070367 B2 | | 4/2008 | |
| JP | 2021503706 A | | 2/2021 | |
| KR | 10-2016-0090104 A | | 7/2016 | |
| KR | 10-2017-0019970 A | | 2/2017 | |
| KR | 10-1783703 B1 | | 10/2017 | |
| KR | 10-1789066 B1 | | 10/2017 | |
| KR | 101783703 | * | 10/2017 | |
| KR | 10-1890844 B1 | | 8/2018 | |
| WO | WO 2018/169157 | * | 9/2018 | |

OTHER PUBLICATIONS

International Search Report of PCT/KR2018/013893 dated Feb. 12, 2019.

* cited by examiner

*FIG. 6*

| COMPONENT OF ELECTRODE | MATERIAL | YOUNG'S MODULUS [Gpa] |
|---|---|---|
| ELECTRODE AND REINFORCING TAB | COPPER (Cu) | 117 |
| | ALUMINUM (Al) | 69 |
| | STAINLESS STEEL (SUS) | 220 |
| ELECTRODE LEAD | ALUMINUM (Al) | 69 |
| | NICKEL (Ni) | 200 |
| | NICKEL-COATED COPPER | 118 |

FORM PATTERN
(UPPER STAMPED PORTION + LOWER STAMPED PORTION)
IN PARALLEL WITH WIDTH OF CASING

WAVE PATTERN

ELECTRODE ASSEMBLY HAVING IMPROVED SAFETY OF USE BY MEANS OF OUTERMOST ELECTRODE STRUCTURE AND CURRENT COLLECTOR MATERIAL, AND LITHIUM-ION SECONDARY BATTERY HAVING SAME

TECHNICAL FIELD

The present disclosure relates to a technique for inducing cutting of an outermost electrode including an electrode lead connection tab before the breakage of a case included in a battery and an internal short circuit occur. The cutting of the outermost electrode induced by using the structure of the outermost electrode and a material of a current collector. For achieving safe use of the battery, the induced cutting prevents the risk of ignition or explosion caused by the breakage of the case and the internal short circuit. The breakage of the case and the internal short circuit are mechanical problems of the battery and may occur due to the repeated externally bending and distortion applied to a battery in a flexible environment.

BACKGROUND

A secondary battery refers to a battery which can be charged and discharged, as opposed to a primary battery which cannot be charged, and has been widely used in the field of advanced electronic device fields such as cellular phone, notebook computer, camcorder, and the like. As the portable electronic devices are manufactured lighter with improved performance and the Internet of Things (IoT) advances, a lot of studies are being conducted on secondary batteries used as power supplies therefor.

Particularly, a lithium secondary battery has a higher voltage than a nickel-cadmium battery or a nickel-hydrogen battery mainly used as power supplies for portable electronic devices and also has a high energy density per unit weight. Therefore, demand for lithium secondary batteries is on the increase.

The secondary battery utilizes an electrochemical reaction occurring between an electrolyte and a cathode and an anode when the cathode and the anode are connected to each other while they are inserted into the electrolyte. Unlike conventional primary batteries, the secondary battery is a chargeable and dischargeable battery which can be recharged with energy by a charger and used again when energy is consumed by an electronic device. Therefore, the use of secondary batteries has increased with the popularization of wireless electronic devices.

Typically, a jelly-roll type electrode assembly in which a separator is inserted between a cathode plate and an anode plate and then spirally wound together, or a flexible stacked type electrode assembly in which multiple cathode plates and anode plates are stacked with a separator interposed therebetween has been used as the lithium secondary battery. For example, a cylindrical battery is manufactured by housing the jelly-roll type electrode assembly in a cylindrical can, injecting an electrolyte thereinto, and sealing the can, and a prismatic battery is manufactured by pressing the jelly-roll type electrode assembly or the stacked type electrode assembly to be flat and housing the flat electrode assembly in a prismatic can. Further, a pouch type battery is manufactured by packing the jelly-roll type electrode assembly or the stacked type electrode assembly together with an electrolyte in a pouch type case. In such an electrode assembly, a cathode tab and an anode tab are withdrawn from a cathode plate and an anode plate, respectively, to the outside of the electrode assembly and then connected to a cathode and an anode lead of a secondary battery.

Meanwhile, in a conventional pouch type lithium secondary battery, a case forming an outer side of the lithium secondary battery is damaged by an intentional force applied from the outside, and, thus, an electrolyte accommodated in the case leaks out and outside air flows into the case. The leakage of the electrolyte inhibits normal operations of peripheral components such as a battery protection circuit by, for example, corroding the peripheral components. Also, the inflow of the outside air causes big safety problems such as ignition.

As a way to improve the durability of a lithium secondary battery, a pattern is formed on a case forming the lithium secondary battery and a terminal reinforcing structure is applied, which enables stable electrochemical driving in spite of bending and distortion which is a repeatedly applied force.

Meanwhile, in a flexible environment, the case may be broken by repeated bending and distortion and a short circuit may occur due to the misalignment and deviation of internal electrodes, which may cause the risk of ignition or explosion. The internal short circuit causes excessive current flow in proportion to a contact area between a cathode and an anode, and, thus, a lot of heat is generated. In this case, a secondary short circuit may additionally occur, and, thus, there is the risk of ignition and explosion.

In general, all electrodes in a winding type battery or a general stacked type battery are connected to the outside, and, thus, an internal short circuit occurs when the electrodes and a separator are damaged due to an external impact.

When the internal short circuit occurs as described above, even if an internal electrode or the outermost electrode, which may be a part of an electrode assembly, is broken, there may be a problem that the capacity is reduced. However, a current can flow to the outside of the electrode assembly, and, thus, there is no problem in the operation of the battery. However, when the battery is continuously used during the internal short circuit, there may be a problem of safety.

To overcome a problem that when an external force is applied to an electrode assembly included in a conventional pouch type battery, the breakage of the electrode assembly and the lack of an electrolyte therein occur, Korean Patent Laid-open Publication No. 10-2016-0090104 discloses an electrode assembly for a flexible battery in which a reinforcing member is provided on one side of the electrode assembly to suppress breakage even when an external force is applied thereto.

Patent Document 1: KR10-2016-0090104A

DISCLOSURE OF THE INVENTION

Problems to be Solved by the Invention

The present disclosure provides a structure for inducing cutting of an outermost electrode including an electrode lead connection tab before the breakage of a case included in a battery and an internal short circuit occur by using the structure of the outermost electrode included in an electrode assembly and a material of a current collector and thus for securing the safety in use.

Means for Solving the Problems

To solve the above-described problem, an electrode assembly according to an aspect of the present disclosure includes: one or more unit cells each including a pair of electrodes having a first electrode and a second electrode and having different polarities with a separator interposed therebetween; an electrode mixture coated on one or both surfaces of the pair of electrodes; and electrode tab protruded from each electrode and not coated with the electrode mixture, and the electrode tab includes an electrode parallel connection tab and an electrode lead connection tab, and any one or more of the electrode parallel connection tab and the electrode lead connection tab are formed on the electrode, and a current collector of the first electrode among the electrodes is made of a different material from a current collector of the second electrode having the different polarity in order for the first electrode including an electrode lead connection tab to be physically cut earlier than the second electrode during bending and distortion.

The current collector of the second electrode has a higher tensile stress than the current collector of the first electrode.

The current collector of the second electrode has a lower Young's modulus than the current collector of the first electrode.

If the current collector of the first electrode is made of copper, the current collector of the second electrode facing the first electrode is made of stainless steel.

If the current collector of the first electrode is made of copper, the current collector of the second electrode facing the first electrode is made of aluminum.

Among electrodes included in the electrode assembly, only the first electrode and the second electrode each including both the electrode parallel connection tab and the electrode lead connection tab are singular in number in the electrode assembly, and the single first electrode is placed on the outermost region of the electrode assembly and the single second electrode is placed as one body on the inside of the first electrode.

The electrode assembly further includes a reinforcing tab welded and fixed on any one electrode lead connection tab among electrode tabs included in the electrode assembly.

An electrode lead joined on any one electrode lead connection tab among electrode tabs included in the electrode assembly further includes a bending structure that is bent in an 180° opposite direction toward the outside of the electrode assembly while it is welded toward the electrode assembly.

A tab-lead joint portion having a structure in which the electrode lead connection tab and an electrode lead are overlapped using the reinforcing tab is inserted and aligned in the separator.

A tab-lead joint portion where the electrode lead connection tab and the electrode lead having the bending structure are joined to each other is inserted and aligned in the separator.

To solve the above-described problem, a lithium ion secondary battery according to another aspect of the present disclosure includes: the electrode assembly; and a case covering the electrode assembly, and the case is equipped with upper stamped portions and lower stamped portions that are repeatedly stamped to cover the outside of the electrode assembly.

The multiple upper stamped portions and lower stamped portions are successively formed in parallel with the width of the electrode assembly and the case.

A maximum bend angle of the lithium secondary battery has an internal angle in the range of from 10° to 180°.

Effects of the Invention

According to the present disclosure, when tensile stress and compressive stress caused by external bending are repeatedly applied onto the electrode assembly, an outermost electrode including an electrode lead connection tab in the electrode assembly is cut earlier than others, and, thus, the current is cut off. Therefore, the function of the battery is lost and the safety in use can be secured.

That is, when an outermost electrode including both an electrode lead connection tab and a parallel connection tab is cut, only one passage for electrons in an active material to move to the outside is cut, and, thus, the current is cut off. Therefore, while the function of the battery is lost, the safety in use can be secured.

An outermost electrode and the other general electrodes included in the electrode assembly according to the present disclosure are connected by a parallel connection tab, and on the outermost electrode, a terminal is formed on an electrode lead connection tab. When an external force, such as bending and distortion, is applied from the outside, the outermost electrode is damaged and cut preferentially over the general electrodes placed on the inside of the outermost electrode. If the outermost electrode including the electrode lead connection tab is cut, the general electrodes connected by the parallel connection tab are shut down while a current is cut off. Therefore, the capacity is sharply reduced and the battery cannot perform its original function.

That is, cutting of the outermost electrode including the electrode lead connection tab is induced before the breakage of the case and an internal short circuit occur by appropriately using the structure of the outermost electrode included in the electrode assembly and a material of a current collector, and, thus, the current is cut off. Therefore, the safety of the battery can be secured.

According to the present disclosure, the flexibility of the battery can be improved by using the shape and the stacked structure of the electrode including both the parallel connection tab and the electrode lead connection tab and cutting of the electrode can be intentionally induced before an internal short circuit caused by the breakage of the case and the precipitation of lithium occurs. Therefore, the function of the battery can be lost and the safety in use of the battery can be secured.

BRIEF DESCRIPTION OF THE DRAWINGS

FIG. 6 is a table showing materials and Young's moduli of a reinforcing tab and a current collector according to an embodiment of the present disclosure.

BEST MODE FOR CARRYING OUT THE INVENTION

Figure 1:
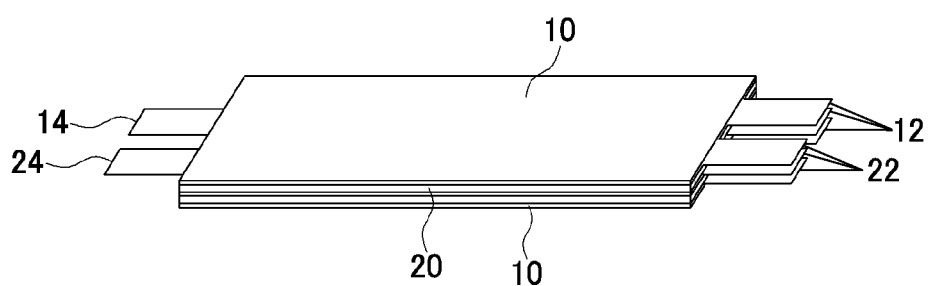
FIG. 1 is an illustration of an exemplary configuration of an electrode assembly included in a flexible battery according to the present disclosure.

Hereafter, a flexible battery according to the present disclosure will be described with reference to the accompanying drawings.

The following exemplary embodiments are provided only for understanding of the present disclosure but not intended to limit the right scope of the present disclosure. Therefore, the inventions that perform the same functions in the same scope as the present disclosure are also included in the right scope of the present disclosure.

Hereinafter, some embodiments of the present disclosure will be described in detail with reference to the accompanying drawings. When reference numerals refer to components of each drawing, although the same components are illustrated in different drawings, the same components are referred to by the same reference numerals as possible. Further, if it is considered that description of related known configuration or function may cloud the gist of the present disclosure, the description thereof will be omitted.

Figure 2:
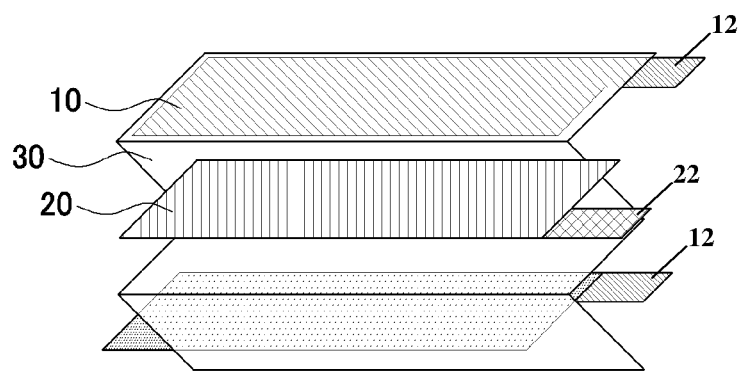
FIG. 2 and FIG. 3 are exploded views of the electrode assembly in which an anode is placed as an outermost electrode according to an embodiment of the present disclosure.
Figure 2:
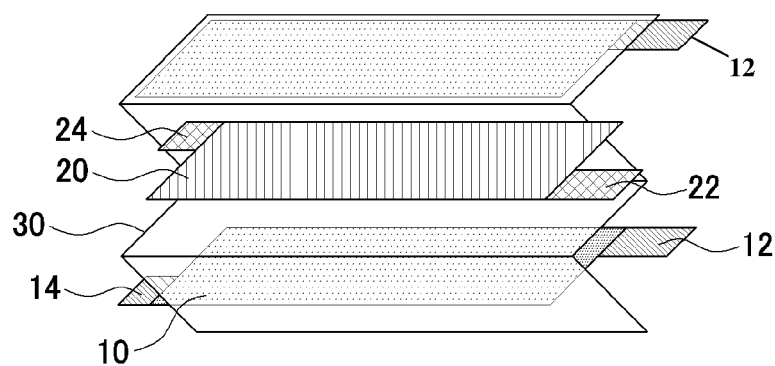
Figure 3:
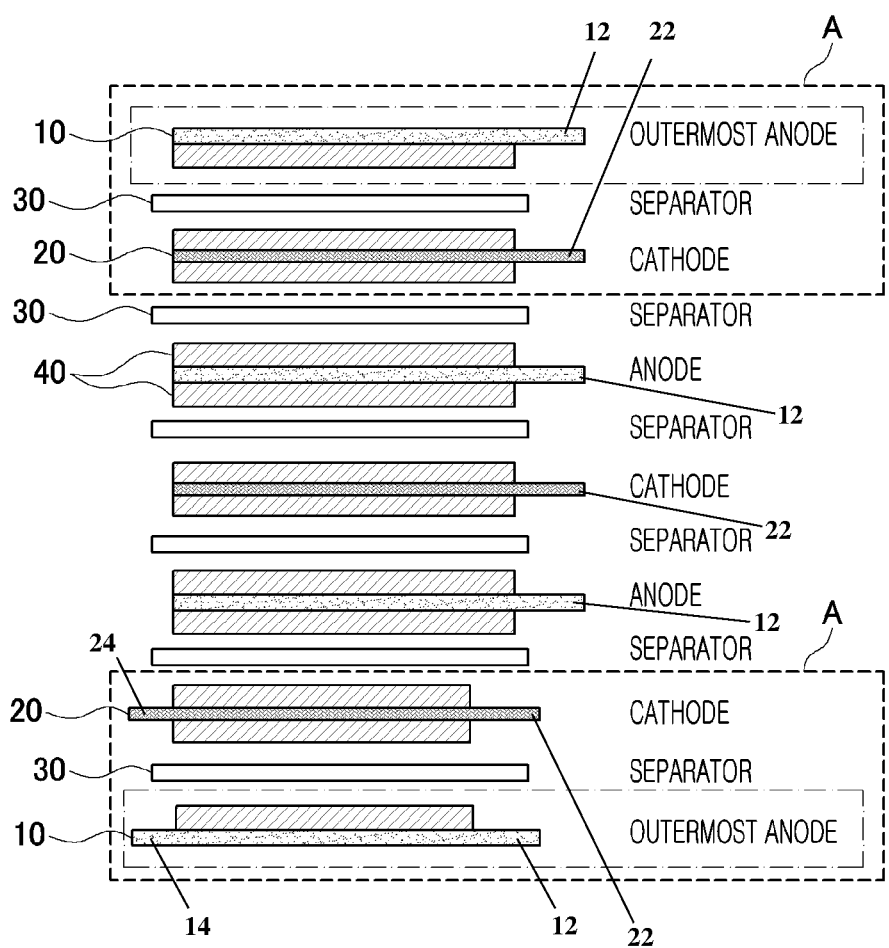

An electrode assembly that can induce cutting of an outermost electrode including an electrode lead connection tab and thus improve the stability in use of a battery according to the present disclosure will be described with reference to FIG. 1 to FIG. 3.

An electrode assembly 100 includes unit cells A each including an anode plate 10 and a cathode plate 20 with a separator 30 interposed therebetween, an electrolyte serving as an ion transport medium between the anode plate and the cathode plate, and electrode tabs protruded from the electrodes and used for electrode parallel connection and electrode lead connection depending on the application. Any one or more of the electrodes including the anode plate 10 and the cathode plate 20 are equipped on both sides with an electrode parallel connection tab and an electrode lead connection tab spaced apart from each other. For example, a certain outermost anode plate 10 placed on the lowermost stage of the electrode assembly 100 is equipped with an anode parallel connection tab 12 and an anode lead connection tab 14, and a certain cathode plate placed on a stage right on the outermost anode plate is equipped with a cathode parallel connection tab 22 and a cathode lead connection tab 24. That is, an anode and a cathode each equipped with an electrode parallel connection tab and an electrode lead connection tab are placed as one body on the lowermost stage of the electrode assembly.

In the electrodes, one or both surfaces of each electrode serving as a current collector are coated with an electrode mixture and the electrode parallel connection tabs and the electrode lead connection tabs are protruded from the electrodes. The electrode parallel connection tabs and the electrode lead connection tabs are exposed without being coated with the electrode mixture.

Some of the multiple electrodes having the same polarity are connected to each other through an electrode parallel connection tab. That is, multiple anode plates 10 and multiple cathode plates 20 are electrically connected in parallel with each other by a tab-tab joint portion connecting electrode tabs.

The electrode assembly is electrically connected through the electrode lead connection tab to an electrode lead exposed to the outside of a case. The separator physically separates the electrodes, but allows ions contained in the electrolyte to pass through.

As for the cathode plates placed on the uppermost stage and the lowermost stage of the electrode assembly, only one surface of each anode plate may be coated with an anode mixture 40.

The electrode parallel connection tab 12 or 22 protruded on the anode plate 10 or the cathode plate 20 electrically connects electrodes having the same polarity in parallel with each other. Tab-tab joint portions connected in parallel with each other are located on the separator covering an outer surface of the outermost electrode placed on the uppermost stage or the lowermost stage of the electrode assembly and then finished and taped.

In the present disclosure, a tab-tab joint portion where the electrode parallel connection tabs 12 and 22 on the electrode are connected in parallel with each other and a tab-lead joint portion where the electrode lead connection tabs 14 and 24 and the electrode lead are connected to each other are electrically connected and joined to each other by any one of joint methods including spot welding, ultrasonic welding, laser welding, and joining with a conductive adhesive.

The electrode assembly according to the present disclosure further includes a separate reinforcing tab on the electrode lead connection tabs 14 and 24 placed on one side of the electrode assembly. The reinforcing tab is joined to an electrode lead, and, thus, the tab-lead joint portion having a backing structure for the electrode lead connection tabs 14 and 24 and the electrode lead is formed using the reinforcing tab. The reinforced joint method for the electrode lead connection tabs 14 and 24 and the electrode lead using the reinforcing tab is applied to at least any one of a cathode tab and an anode tab.

The reinforcing tab reinforces the strength of joint portions between the respective electrode lead connection tabs 14 and 24 and the electrode lead and thus physically reinforces the joint portions. For example, on an upper stage of the electrode lead connection tab extended from the electrode of the electrode assembly, the reinforcing tab formed of a homogeneous or heterogeneous metal and having a thickness one to five times greater than the electrode lead connection tab is overlapped by welded. The overlapped reinforcing tab and the electrode lead connection tab may have the same thickness or different thicknesses. The overlapped reinforcing tab may have a width of 3 mm to 5 mm and a length of 2 mm to 4 mm. However, this is just an example and the present disclosure is not limited thereto.

Specifically, the electrode lead assembled on the overlapped reinforcing tab joined to the electrode lead connection tab may have a width of 2 mm to 3 mm and a length of 0.5 mm to 1 mm. However, this is just an example and the present disclosure is not limited thereto. The current collector of the electrode in the present disclosure may be any one of a group consisting of aluminum, stainless steel and copper, and the electrode lead may be formed of any one material of a group consisting of aluminum, nickel and nickel-coated copper. The overlapped reinforcing tab on the tab-lead joint portion for the electrode lead connection tab and the electrode lead is formed into any one shape of a group consisting of a circular shape, an oval shape and a polygonal shape.

In the electrode assembly according to the present disclosure, an electrode lead bending joint structure may be joined on the electrode lead connection tabs 14 and 24.

While the electrode lead is placed in parallel above the electrode lead connection tab, a part of an end of the electrode lead is welded on an upper end of the electrode lead connection tab. In this state, the electrode lead is bent 180°, and, thus, the electrode lead is bent from the electrode lead connection tab toward the outside of the electrode assembly. Accordingly, it is possible to obtain a joint reinforcing structure between the electrode tab and the electrode lead with a minimized local mechanical load in a flexible environment. This method of joining the electrode lead connection tab and the electrode lead by bending can be applied to at least any one of a cathode tab and an anode tab.

In an embodiment of the present disclosure, the lithium secondary battery is a flexible lithium secondary battery having bendability, and the maximum bend angle of the lithium secondary battery has an internal angle in the range of from 10° to 180°. A normal state where the lithium secondary battery is not bent is set to an internal angle of 180° and the lithium secondary battery is repeatedly bent around its central portion to an internal angle of 10° to implement a flexible battery which can perform a normal electrochemical operation even under compressive stress and tensile stress caused by an external force.

That is, in the present disclosure, a metal tab is used between a first electrode tab and an electrode lead to resolve a stress problem occurring in a flexible lithium secondary battery and particularly a tear or separation of a thin current collector (e.g., copper) of a first electrode when a thick electrode lead (e.g., nickel) is also bent.

Meanwhile, the tab-lead joint portions in which the electrode lead connection tabs 14 and 24 are joined to the electrode lead using the reinforcing tab and the tab-lead joint portion in which the electrode lead connection tab is joined to the electrode lead having a bending tab structure are inserted/aligned in the separator. Accordingly, it is possible to protect a flexible battery by suppressing the exposure of a terminal portion to the outside which is the greatest weakness of the flexible battery.

Figure 4:
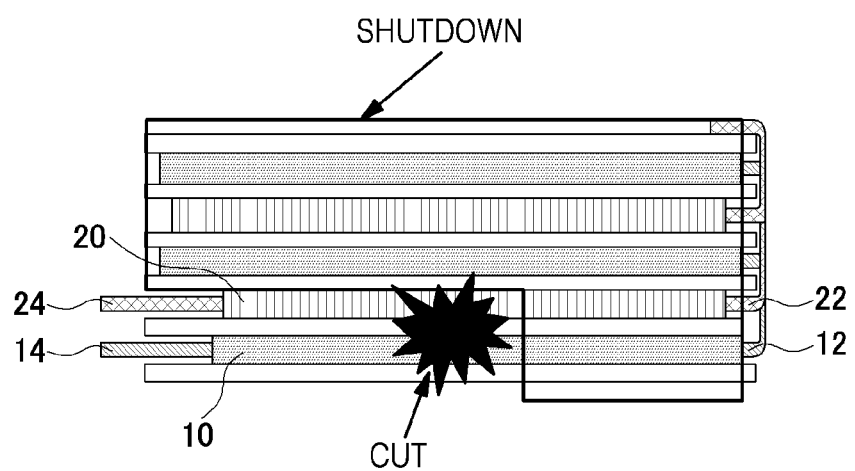
FIG. 4 shows that when an outermost electrode including an electrode lead connection tab is cut, the other internal electrodes included in the electrode assembly are put in a shutdown state.

FIG. 4 shows that when an outermost electrode including an electrode lead connection tab is cut, the other internal electrodes included in the electrode assembly are put in a shutdown state.

Specifically, multiple electrodes included in the electrode assembly are connected to each other by the parallel connection tab on the right side, and a terminal is formed at an electrode lead connection tab on the outermost electrode on a lower stage of the plurality of electrodes.

Among electrodes included in the electrode assembly, only a first electrode and a second electrode each including both the electrode parallel connection tab and the electrode lead connection tab are singular in number in the electrode assembly and thus can be put in the shutdown state. The single first electrode is placed on the outermost region of the electrode assembly and the single second electrode is placed as one body on the inside of the first electrode.

In this state, when an external force such as bending and distortion is applied onto the electrode assembly from the outside, the outermost electrode placed on the lower stage is damaged and cut preferentially over the electrodes placed inside the electrode assembly.

In this case, if the outermost electrode including the electrode lead connection tab is broken, the electrodes connected by the parallel connection tap are not supplied with a current and are put in a shutdown state. Therefore, the capacity is sharply reduced and the battery cannot perform its original function. Accordingly, unlike conventional batteries, the battery of the present disclosure provides a function to suppress the risk of ignition that may occur due to an internal short circuit when it is continuously used in spite of damage to the internal electrodes.

To this end, the present disclosure includes cutting of the electrode including the electrode lead connection tab before the breakage of the case and an internal short circuit occur by appropriately using the structure of an outermost electrode and a material of a current collector. This intended structure can be applied to a device that protects a battery safely against the risk of carelessness or excessive bending of the user and needs to secure and control the performance of a flexible battery when the flexible battery is bent a predetermined number of times or more by an external force.

Figure 5:
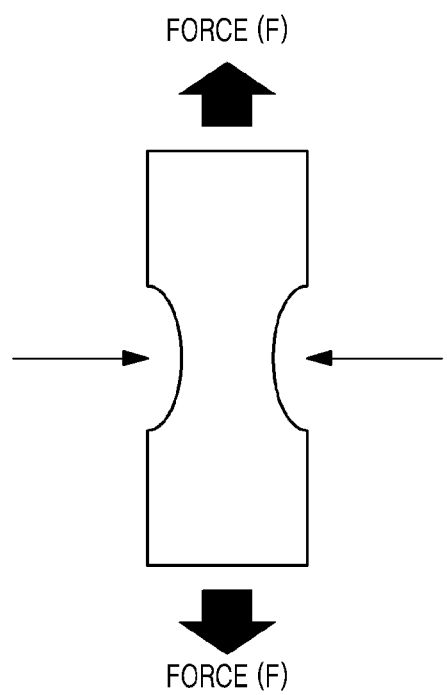
FIG. 5 illustrates how to perform a tensile stress test on a reinforcing tab and a current collector of an electrode according to an embodiment of the present disclosure.

FIG. 5 illustrates how to perform a tensile stress test on a metal tab and a current collector of an electrode according to an embodiment of the present disclosure. When force is applied to both ends of a battery material, the battery material gradually decreases in the cross-sectional area and then is cut. In this case, the battery material generates an internal force resistant to the pulling force from the outside, and the stress is defined by dividing the resistant force by the cross-sectional area. Tensile stress refers to stress applied to the inside of a material until the material is cut by tensile force in a pulling direction, i.e., a stress value measured in a tensile test. Even if the same magnitude of force is applied, tensile stress to be applied to the inside varies depending on the size, thickness, and shape of a battery material.

In the present disclosure, among the first electrode and the second electrode having different polarities with a separator interposed therebetween, the first electrode including the electrode lead connection tab is physically cut earlier than the second electrode during bending and distortion. To this end, a current collector of the first electrode is made of a different material from a current collector of the second electrode having the different polarity.

Meanwhile, the current collector of the second electrode has a higher tensile stress than the current collector of the first electrode. For example, if the current collector of the first electrode is made of copper, the current collector of the second electrode is made of stainless steel.

FIG. 6 is a table showing materials and Young's moduli of a reinforcing tab, a current collector of an electrode and an electrode lead according to an embodiment of the present disclosure.

As illustrated in FIG. 6, the components can be assorted by materials such as aluminum, copper, stainless steel and nickel.

Meanwhile, Young's modulus is a coefficient indicating how much a relative length of an elastic object is changed by an external force (stress). This is not relevant to the shape of the object but only relevant to the material of the object.

In the present disclosure, among the first electrode and the second electrode having different polarities with the separator interposed therebetween, the first electrode including the electrode lead connection tab is physically cut earlier than the second electrode during bending and distortion. To this end, the current collector of the first electrode is made of a different material from the current collector of the second electrode having the different polarity.

Meanwhile, the current collector of the second electrode has a lower Young's modulus than the current collector of the first electrode. For example, if the current collector of the first electrode is made of copper, the current collector of the second electrode is made of aluminum, but is not limited thereto.

Figure 7:
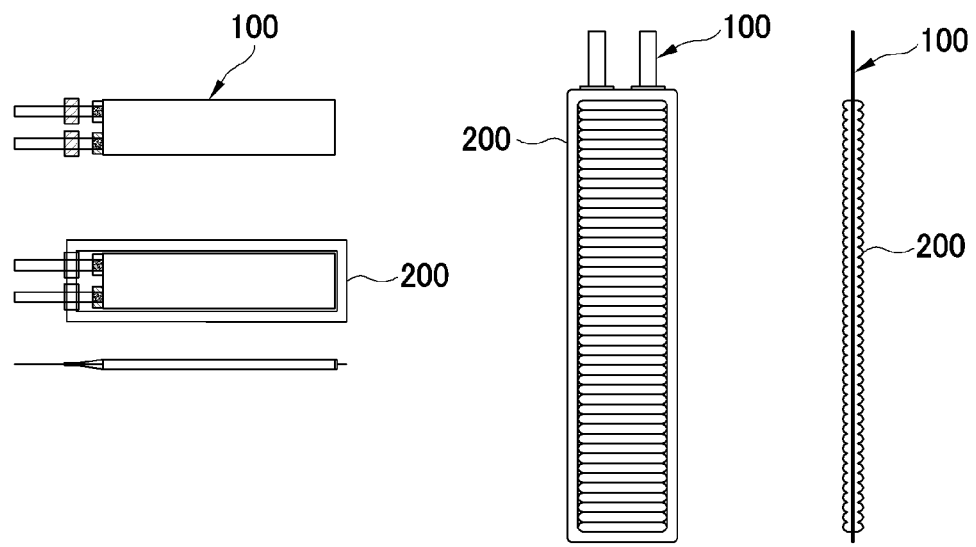
FIG. 7 illustrates a flexible battery including an electrode assembly and a case covering the electrode assembly.

Referring to FIG. 7, a case 200 having a structure in which upper stamped portions and lower stamped portions are repeatedly stamped is placed to cover the outside of the electrode assembly according to the present disclosure.

Figure 8:
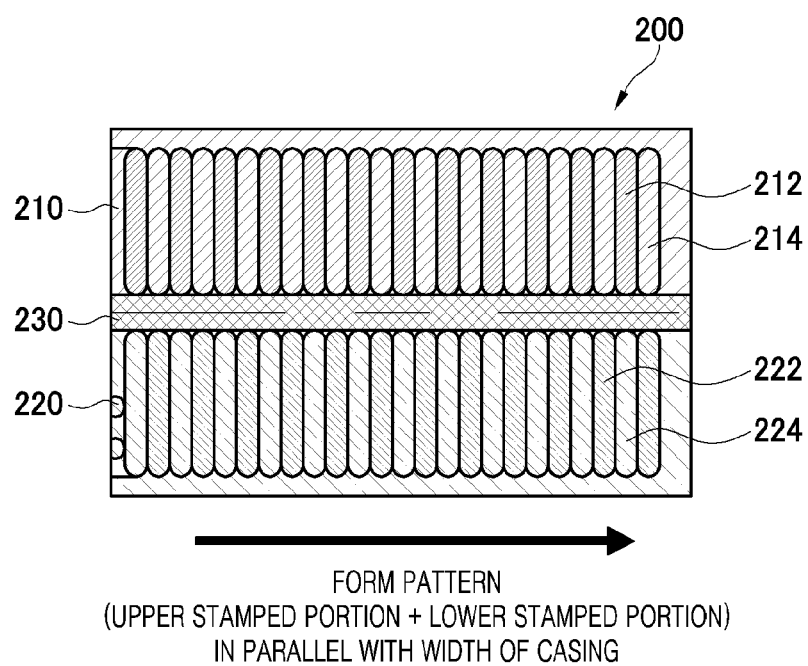
FIG. 8 illustrates a pattern of upper stamped portions and lower stamped portions formed in parallel with the width of a case included in a flexible battery.

Referring to FIG. 8, the multiple upper stamped portions and lower stamped portions repeatedly stamped on the case have a repeated pattern and shape and thus can compress and tension the flexible battery including the electrode assembly during bending, twist, or crumpling.

The multiple upper stamped portions and lower stamped portions are successively formed in parallel with the width of the electrode assembly and the case.

The multiple upper stamped portions and lower stamped portions are stamped by an upper mold and a lower mold, respectively.

The case covering the outside of the electrode assembly may include an upper case 210 and a lower case 220 on the electrode assembly based on a red dotted line in a sealing portion 230. That is, multiple upper stamped portions 212 and 222 and multiple lower stamped portions 214 and 224 repeatedly formed on the case are symmetric based on the sealing portion and symmetrically stamped on the upper case 210 and the lower case 220. In this state, the sealing portion is bent in a vertically symmetric manner and then, the electrode assembly is housed inside the case.

The sealing portion as the basis of division between the upper case 210 and the lower case 220 may have a width of 3 mm to 5 mm, and a substantive sealing may have a width of 1 mm to 2 mm. However, this is just an example and the present disclosure is not limited thereto.

Figure 9:
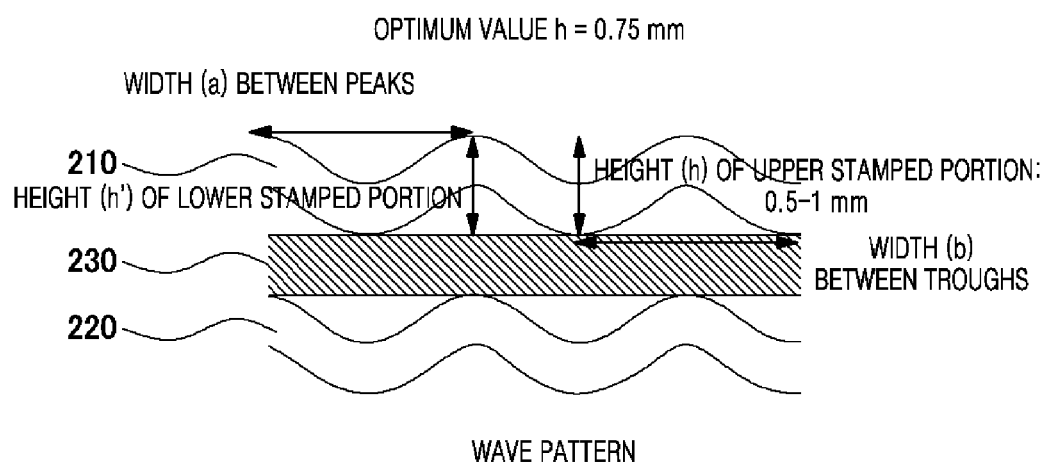
FIG. 9 illustrates specific shapes of upper stamped portions and lower stamped portions formed in a case.

Referring to FIG. 9, a height h of the multiple upper stamped portions repeated on the case may be identical to a height h' of the multiple lower stamped portions repeated on the case (h=h').

The heights h and h' of the multiple upper stamped portions and lower stamped portions repeated on the case may be in the range of 0.5 mm to 1 mm and have an optimum value of 0.75 mm. However, this is just an example and the present disclosure is not limited thereto.

Further, a width a between peaks of the multiple upper stamped portions adjacent to each other on the case may be identical to a width b between troughs of the multiple lower stamped portions (a=b), and, thus, a wave pattern is formed.

In the present disclosure, an anode is placed as an outermost electrode in an electrode assembly including multiple electrodes stacked in a vertical direction with a separator interposed therebetween to suppress the breakage of an electrode terminal during bending of a flexible battery.

Figure 10:
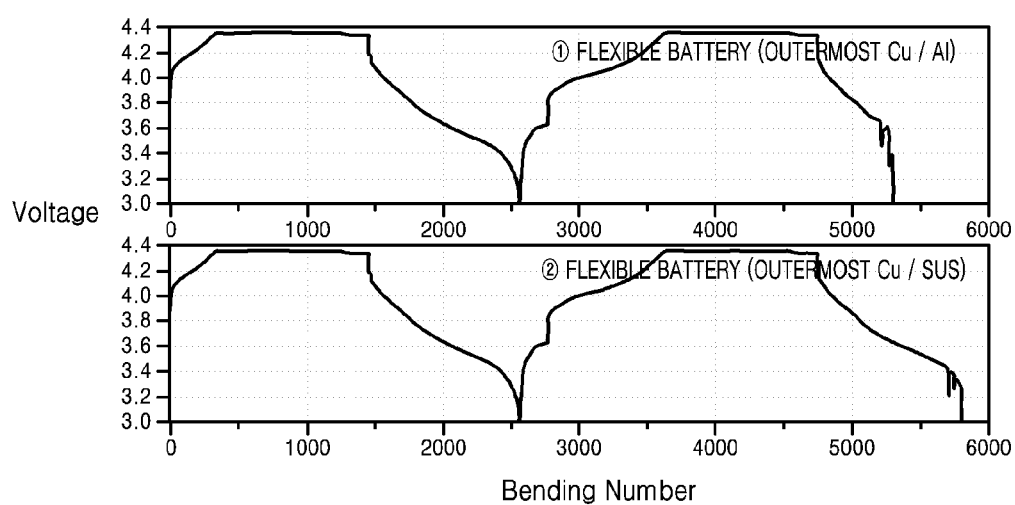
FIG. 10 shows the result of bending tests according to an embodiment of the present disclosure.

FIG. 10 shows the results of bending tests depending on the structure of the first electrode and the second electrode included in the electrode assembly and the materials of the current collectors according to an embodiment of the present disclosure.

The first graph shows the result of a bending test on a case where the current collector of the first electrode located on the lowermost stage is made of copper and the current collector of the second electrode right adjacent to an outermost electrode is made of aluminum having a lower Young's modulus. It can be seen that a noise was generated after bending approximately 5,000 to 6,000 times and the voltage dropped to be equal or less than the operating voltage.

The second graph shows the result of a bending test on a case where the current collector of the first electrode located on the lowermost stage is made of copper and the current collector of the second electrode right adjacent to an outermost electrode is made of stainless steel having a higher tensile stress than the current collector of the first electrode. It can be seen that the outermost electrode made of copper was cut after bending approximately 5,000 to 6,000 times.

According to the results of numerous tests, the safety in use of a battery can be secured by intentionally designing damage and cutting of an electrode before bending 8,000 times which is highly likely to cause breakage of the case or incur an internal short circuit caused by the precipitation of lithium.

According to the present disclosure, the structure of an outermost electrode in an electrode assembly and a material of a current collector are optimized, and, thus, when an external bending force is repeatedly applied, the outermost electrode including an electrode lead connection tab is cut, and, thus, the current is cut off. Therefore, the function of the battery is lost and the safety in use can be secured against a danger caused by the carelessness of a user or excessive bending.

In stack structure, a cathode and an anode each including both an electrode lead connection tab and a parallel connection tab are placed adjacent to one of the outermost region of an electrode assembly and electrodes each including only a parallel connection tab are sequentially stacked on the outermost electrodes.

In a flexible battery having a normal case pattern and a reinforcing terminal structure, a case can be broken or an internal short circuit can be caused by the precipitation of lithium before or after repeated bending 8,000 times.

To overcome this problem, in the present disclosure, cutting of an electrode is induced before bending 5,000 times by appropriately adjusting the type and placement of the electrode included in an electrode assembly.

Accordingly, a connection portion between electrodes each including only a parallel connection tab becomes useless at the same time the current is cut off. Therefore, the capacity is sharply reduced and the battery cannot perform its original function.

We claim:

1. An electrode assembly included in a flexible secondary battery, comprising:
   a plurality of unit cells that each include a pair of electrodes having a first electrode and a second electrode with a separator interposed therebetween,
   wherein the first electrode in each of the plurality of unit cells includes a first electrode parallel connection tab protruding from the first electrode, the first electrode in each of the plurality of the unit cells being connected to each other by the first electrode parallel connection tab protruding from the first electrode in each of the plurality of the unit cells,
   wherein the plurality of unit cells includes a first unit cell and one or more additional unit cells, and the first electrode in the first unit cell including the first electrode parallel connection tab and an electrode lead connection tab that each protrude from the first electrode in the first unit cell, and
   wherein the first electrode in the first unit cell is in an outermost region of the electrode assembly, a current collector of the second electrode in the first unit cell has a lower Young's modulus than a current collector of the first electrode in the first unit cell, and the first electrode in the first unit cell is configured to be cut by repeated external bending of the electrode assembly of less than 5,000 times and prior to the second electrode in the first unit cell and the first electrode and the second electrode in each of the one or more additional unit cells.

2. The electrode assembly of claim 1, wherein the current collector of the first electrode in the first unit cell is made of copper, the current collector of the second electrode in the first unit cell facing the first electrode in the first unit cell is made of aluminum.

3. The electrode assembly of claim 1, wherein the second electrode in each of the plurality of unit cells includes a second electrode parallel connection tab protruding from the second electrode, the second electrode in each of the plurality of the unit cells being connected to each other by the second electrode parallel connection tab protruding from the second electrode in each of the plurality of the unit cells, the second electrode in the first unit cell includes the second parallel connection tab and an electrode lead connection tab that each protrude from the second electrode in the first unit cell, among all of the first electrodes and the second electrodes in the electrode assembly, only the first electrode and the second electrode in the first unit cell each include both the electrode parallel connection tab and the electrode lead connection tab, respectively, and in the first unit cell, the second electrode is placed on the inside of the first electrode.

4. A lithium ion secondary battery comprising:
the electrode assembly of claim 1; and
a case covering the electrode assembly,
wherein the case is equipped with upper stamped portions and lower stamped portions that are repeatedly stamped to cover an outside of the electrode assembly.

5. The lithium ion secondary battery of claim 4, wherein the upper stamped portions and lower stamped portions are successively formed in parallel with a width of the electrode assembly and the case.

6. The lithium ion secondary battery of claim 4, wherein a bend angle of the lithium secondary battery including the electrode assembly has an internal angle in a range of from 10° to 180°.

7. The lithium ion secondary battery of claim 5, wherein a bend angle of the lithium secondary battery including the electrode assembly has an internal angle in a range of from 10° to 180°.

8. The electrode assembly of claim 1, wherein as only the first electrode in the first unit cell includes the electrode lead connection tab among the first electrodes in the plurality of unit cells the cut of the first electrode in the first unit cell puts the first electrode and the second electrode in each of the one or more additional unit cells in a shutdown state.

* * * * *